(12) United States Patent
Lumelsky

(10) Patent No.: US 6,885,847 B1
(45) Date of Patent: Apr. 26, 2005

(54) EXTENSION MECHANISM AND TECHNIQUE FOR ENABLING LOW-POWER END DEVICES TO ACCESS REMOTE NETWORKS USING SHORT-RANGE WIRELESS COMMUNICATIONS MEANS

(75) Inventor: Leon Lumelsky, Stamford, CT (US)

(73) Assignee: Symantec Corp., Cupertino, CA (US)

( * ) Notice: Subject to any disclaimer, the term of this patent is extended or adjusted under 35 U.S.C. 154(b) by 780 days.

(21) Appl. No.: 09/685,715

(22) Filed: Oct. 10, 2000

(51) Int. Cl.⁷ ................................. H04B 7/00
(52) U.S. Cl. ................ 455/41.2; 455/575.7; 455/63.4; 455/66.1; 455/95; 455/129; 370/328; 370/337; 370/338; 370/401; 370/400; 709/217; 709/219
(58) Field of Search ................ 455/466, 524, 455/517, 525, 435.1; 370/401, 338, 328, 377, 331

(56) References Cited

U.S. PATENT DOCUMENTS

| | | | |
|---|---|---|---|
| 5,724,346 A | * | 3/1998 | Kobayashi et al. .......... 370/329 |
| 6,175,860 B1 | * | 1/2001 | Gaucher ...................... 709/208 |
| 6,525,855 B1 | * | 2/2003 | Westbrook et al. .......... 398/168 |
| 6,542,791 B1 | * | 4/2003 | Perez .......................... 700/295 |
| 6,549,786 B2 | * | 4/2003 | Cheung et al. .............. 455/524 |
| 6,614,768 B1 | * | 9/2003 | Mahany et al. .............. 370/328 |
| 6,654,378 B1 | * | 11/2003 | Mahany et al. .............. 370/401 |

* cited by examiner

*Primary Examiner*—William Trost
*Assistant Examiner*—Danh C Le
(74) *Attorney, Agent, or Firm*—Marcia L. Doubet

(57) ABSTRACT

The present invention provides methods, systems, devices, and computer program instructions for enabling low-power wireless devices (such as wireless telephones and personal digital assistants, or PDAs) to connect to a fast wired or wireless voice/data network. A novel relay point device, referred to as an "extension point", is defined that flexibly extends the effective reach of network access points. Use of extension points enables the network infrastructure to be expanded (and subsequently re-configured, if necessary) simply and cost-effectively, requiring little or no additional physical wiring. The defined techniques provide an infrastructure that is scalable, supporting a large number of end users without substantial degradation to connection establishment time and data rates. Using the disclosed techniques, end devices are able to reach network services, and to communicate with other end devices, beyond the nominal working range of these devices and without limitation to the numbers of such devices.

53 Claims, 10 Drawing Sheets

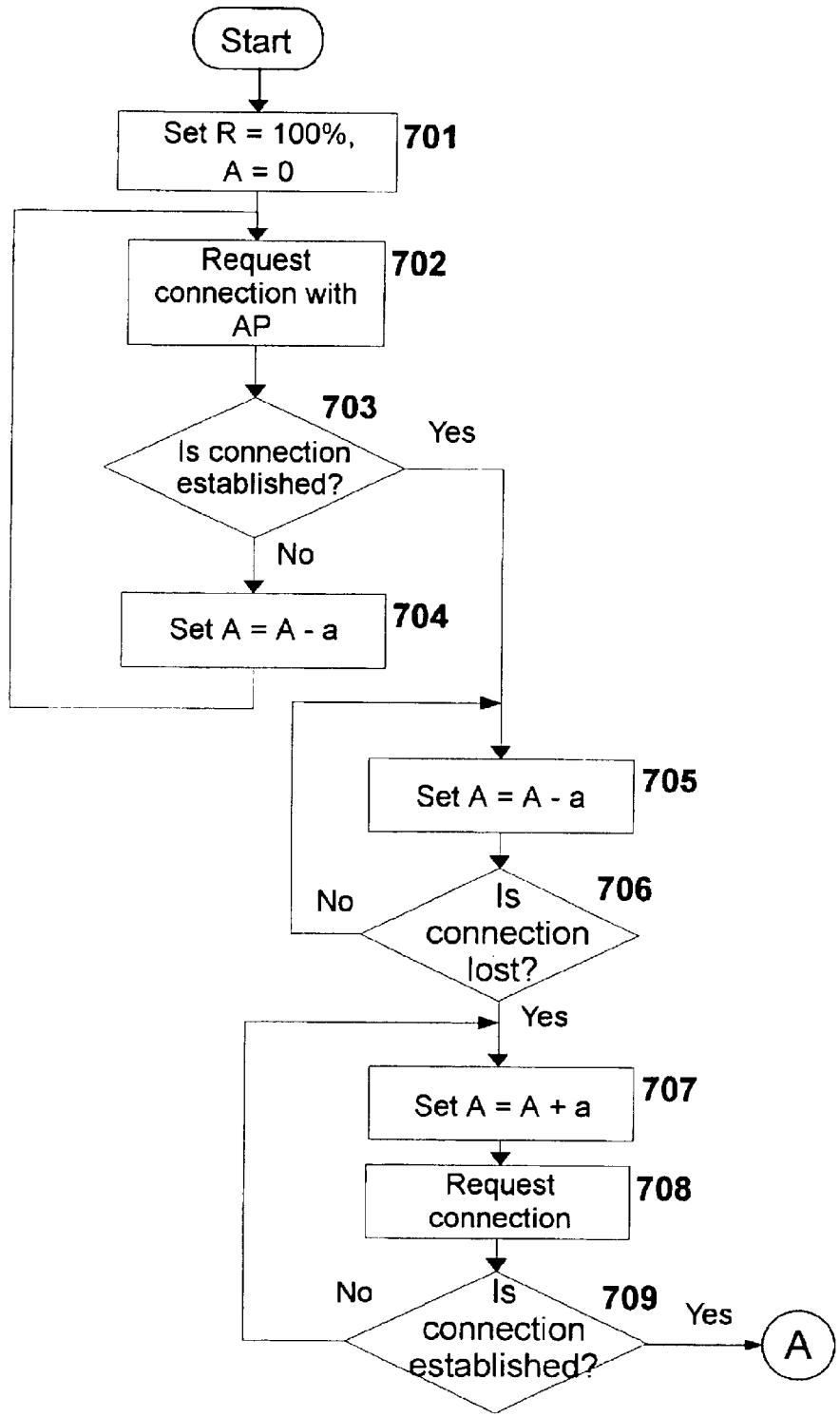

FIG. 9

Extension Point Parameters Block (EP_PB)

| 902 Routing path | 903 Location coordinates | 904 Number of SCO links in Piconet | 905 Number of ACL links in Piconet |
|---|---|---|---|
| a1, a2, a3, ..., am, | X1,Y1,Z1 | S1 | A1 |
| b1, b2, b3, ..., bn | X2,Y2,Z2 | S2 | A2 |
| ... | | | |

900

EXTENSION MECHANISM AND TECHNIQUE FOR ENABLING LOW-POWER END DEVICES TO ACCESS REMOTE NETWORKS USING SHORT-RANGE WIRELESS COMMUNICATIONS MEANS

FIELD OF THE INVENTION

The present invention relates to wireless communication networks, and more particularly to methods, systems, devices, and computer program instructions for flexibly and efficiently enabling end-user communication devices to access a remote network from a short-range networking environment.

BACKGROUND OF THE INVENTION

The recent explosion of small and portable wireless battery-powered devices (hereinafter, "WBPDs"), such as cellular phones and personal digital assistants (PDAs), has escalated both the desire to exchange information directly between such devices and the desire to obtain access to conventional network and application services from these devices. Due to the relatively short battery life of these devices, tradeoffs must be made between the available network bandwidth and the wireless transmission range. The need to support reasonable bandwidth for interactive applications, multimedia, and so forth on these devices consequently drove the emergence of short-range communication technologies.

Examples of these short-range communication technologies include IEEE 802.11, HomeRF, and Sharewave. (IEEE 802.11 is a standard of the Institute for Electrical and Electronics Engineers, which was approved in 1997 for wireless Local Area Network, or LAN, signaling and protocols. HomeRF and Sharewave are directed towards in-home networking solutions. More information on these techniques can be found on the Internet at www.ieee.org, www.homerf.com, and www.sharewave.com, respectively.)

Devices using these prior art technologies typically comply to a wireless peer-to-peer networking protocol, allowing for multiple simultaneous device interactions of ranges of 50 meters or more, with data rates well above 1 Megabit per second (Mbps). However, the power consumption requirements for these technologies are too high to make them good candidates for use with WBPDs. Consequently, simpler, less power demanding wireless networking technologies are beginning to appear. Unfortunately, to achieve the reduced power requirements, these newer technologies place more severe restrictions on the distance and data rate of the wireless communication, as well as on the number of devices that may communicate simultaneously.

One of the most recent examples of these newer wireless technologies is known as "Bluetooth". (Refer to location www.bluetooth.com on the Internet for more information on Bluetooth.) Bluetooth was initially designed to replace cables between closely located devices. Bluetooth technology is therefore optimized for short-haul, point-to-point connectivity. Bluetooth-enabled devices also consume less power than devices that are designed according to the older wireless technologies such as 802.11. Because of these factors, Bluetooth is one obvious candidate for use with WBPDs.

However, although Bluetooth-enabled devices have a number of beneficial attributes, the Bluetooth design point leads to severe disadvantages when compared with the older wireless technologies in terms of the previously-stated factors of distance, data rate, and number of communicating devices.

The disadvantage in terms of distance can be seen by comparing Bluetooth to 802.11. 802.11 technologies provide connections between a base station and end devices over distances that may exceed 100 meters. Bluetooth connects across much shorter distances, typically less than 10 meters for those devices classified in the Bluetooth standard as "Class 3 devices." (Class 1 Bluetooth devices are the most powerful devices defined according to the Bluetooth standard, and they provide connections over distances up to 100 meters; however, these Class 1 devices require considerably more power than Class 3 devices.) The working distance between Class 3 and Class 1 Bluetooth devices is required to be 10 meters or less. (This is because different class devices must tune their receivers to have equal sensitivity; in this case, they must tune to the sensitivity of the Class 3 device, on the order of −70 decibels relative to 1 milliwatt, or −70 dBm.)

In terms of data rate, the older wireless technologies provide much higher data rates than Bluetooth. 802.11, for example, offers data rates to up to 11 Mbps. Bluetooth, on the other hand, has a shareable raw data rate of less than 1 Mbps. For pure asynchronous connection-less (ACL) links, the effective data rate is approximately 720 Kilobits per second (Kbps). A device may participate in up to three synchronous connection-oriented (SCO) links, in which case the effective ACL data rate is reduced to less than 440 Kbps.

Regarding the third disadvantage, the number of devices supported in the older wireless technologies is typically limited only by the performance of the individual end devices that are communicating via the shared wireless LAN. The number of Bluetooth devices, however, is severely restricted by the Bluetooth architecture. The architecture defines master and slave roles for a group of devices connected in an ad-hoc network configuration referred to as a "piconet," and it specifies that a device serving as a master in a piconet may not control more than 7 active slave devices at one time.

In spite of the limitations of existing wireless connectivity solutions suitable for personal WBPDs, users have an ever-increasing desire to connect their personal WBPDs to networks, including large Internet Protocol (IP) networks, home networks, corporate LANs, and the Internet.

Two approaches have emerged for satisfying these consumer demands. In the first solution, an intermediary device that is customarily referred to as an "Access Point" (AP) has been produced by several companies. In the second solution, a "scatternet" approach is used to expand a network to accommodate multiple WBPDs. Each of these approaches will now be described.

FIG. 1 illustrates a networking environment according to the first approach, in which several access points 140, 141, . . . are used to connect end user devices such as those depicted at 130, 131, and 132 to an IP data network 120. (The IP data network in this prior art scenario may be either wired or wireless; the distinction is not pertinent to the present discussion.) These AP devices of the prior art may be based on a conventional computing device, which has both Bluetooth and LAN network adapters (for communicating with end devices 130, 131, 132 and network 120, respectively). Or, the AP device may be a special-purpose, dedicated device that combines both of these adapters and provides the necessary bridging functions between them.

However, these existing Bluetooth-based access points have distinct disadvantages when compared to longer-range wireless communication solutions, such as 802.11, or wire area wireless communications. While an AP based on Bluetooth technology (and its 10 meter limitations) may be fine for home or small office environments, these disadvantages make it a less attractive choice as compared to a wireless LAN for serving a crowded wireless environment like a conference room (or for serving a large space such as an airport or school) as will now be described.

A first disadvantage of Bluetooth AP solutions is that the number of APs may need to be excessively large due to limitations of the Bluetooth design specifications. A single AP (i.e. a Bluetooth Class 3 device) operation in the role of a master within a piconet can serve an areas having a 10 meter radius, providing a circular area of coverage of approximately 314 square meters. Adapting this circular coverage area to a conference room having a square shape (while covering the entire room), one AP can serve a square room of approximately 14.2 meters by 14.2 meters, or 200 square meters. In compliance with the Bluetooth specifications, however, this AP can support only 7 active Bluetooth slave devices. Hence, if the conference room has 50 seats and all the users seated in the room must be provided with on-line connections at the same time, then the minimal number of required APs is 8. (In the general case, the number of APs required to support N users distributed within the circular coverage range of a single AP is the ceiling of the expression N/7, or $\lceil N/7 \rceil$.

Second, the number of APs may depend on the shape of the place in which the APs are used. For example, if the same 200-square meter conference room in the above example has an elongated or L-shape, rather than a square shape, then coverage with 8 APs is no longer sufficient. Suppose that the dimensions of the room are 10 meters by 20 meters. Because the lengthwise distance of the room is longer than 14.2 meters, a single AP is no longer capable of serving users located throughout the room. To provide network connectivity throughout this rectangular shaped 200-square meter room, the number of APs must be doubled to 16 because it may happen that all 50 users are crowded first at one end of the room and later at the other end.

Third, the number of APs may need to be even larger, because the locations of the end devices may be dynamic and unpredictable, and network capacity must be able to accommodate the worst-case number of active users as the users move around the room. For example, suppose APs are used within a museum to provide information to museum visitors as they view each painting within a large open space. To ensure that each museum visitor can make a connection as he views each painting, enough network capacity must be provided at each painting to support the entire group of visitors, even though most of the time little to none of this capacity is required (i.e. most of the time, no users or a very small number of users is standing in front of any one painting).

Another, and perhaps the most important, disadvantage of Bluetooth AP solutions is that the installation of APs requires additional wiring, making the infrastructure installation very expensive. Each AP requires an additional power plug and an additional network connection or port. In other words, a Bluetooth network using APs may require a large number of wired jacks, making the supposedly "wireless" network wireless only for the end devices. Extensive wiring causes high labor costs, and may possibly even surpass the cost of the APs in the near future, as AP cost decreases with proliferation of the technology. As a result, installation of a Bluetooth AP network may be as costly as installation of a fully wired network.

A further disadvantage of building a network infrastructure using Bluetooth APs is that such networks are not easily scalable to add more users, nor are they easily reconfigurable to modify the area of coverage. Both types of changes will typically require installation of additional wiring to support additional APs or movement of existing APs to new locations (in which case, new wiring may be required at the new location).

Using a wireless LAN such as 802.11 in the AP configuration, instead of Bluetooth, does not eliminate these problems: Power wiring is still required. Furthermore, in an area where Bluetooth communication is already in use, it may not be a good idea to introduce a wireless LAN using another technology because the wireless LAN shares the same radio spectrum (i.e. 2.4 GHz, the ISM) as Bluetooth, along with microwaves, cordless telephones, and other technologies. Interference in this environment may lead to unacceptably low performance of both networks when a large number of wireless dongles is concentrated in a space that provides service to a large number of users.

The scatternet approach of the second solution to providing network access for multiple WBPDs uses multiple piconets communicating with each other in a daisy-chained fashion, wherein an end device may play a dual role of a master in one piconet and a slave in another. One AP may support more than 7 end devices in this configuration. For example, if a first piconet lacks an AP and therefore cannot communicate with network, but the master of this first piconet is within range of a second piconet which does have an AP connected to the network, then the devices of the first piconet can communicate with the network (and with the devices of the second piconet) by virtue of the first piconet's master also playing the role of a slave in the second piconet. Additional wiring is not required in this scatternet approach, because any of the end devices may serve as bridges between the two piconets and thereby extend the reach of the network.

On a negative side, however, such an easy solution to scalability may cause a substantial diminishing of performance. Continuing the previous example of 50 users in a room, if this room is served by a single AP that is daisy-chained to multiple piconets, the daisy-chaining approach leads to a degradation of the useful payload rate to less than $\frac{1}{50}$th of 720 Kbps, or about 10–14 Kbps. This number is comparable with wide-area network data rates, which do not require any additional hardware to install. Moreover, network delay is longer for those devices that connect to the network through the daisy chain. For example, if the connection set-up time within one piconet is from 1 to 5 seconds, then the last user in a daisy-chained scatternet comprised of 8 piconets will require approximately 8 to 40 seconds before being connected to the network.

Furthermore, if one or several of the portable end devices serving as masters in the ad-hoc daisy chain fails, is turned off, or leaves the room, then the rest of the chain will be cut off from the network permanently or temporarily (i.e. until one of the slave devices is found that can become a master). When this happens, considerable complexity is introduced to maintain an up-to-date routing structure for data through the scatternet between the APs and the end devices.

Using a scatternet also leads to unpredictable data rates and latencies for the end devices, because the number of daisy-chained piconets is unpredictable. There is no minimum guaranteed performance for the end devices positioned lower in the chain, because it will depend on the number of devices that are higher in the chain and the resources they consume. Moreover, as the piconet routing structure changes, as described above, the data rates and latencies may also change dynamically.

Accordingly, what is needed is an efficient, cost-effective technique for enabling multiple WBPDs to connect to a network that avoids the limitations of prior art techniques.

SUMMARY OF THE INVENTION

The present invention is directed to methods, systems, devices, and computer program instructions for flexibly expanding the number of end-user communication devices or WBPDs supported in a short-range networking environment with minimal added installation and configuration costs and enabling these devices to access a remote network. Relay points, referred to herein equivalently as "extension points" or "EPs", are defined and are used to provide network connectivity to WBPDs that may be out of range of a network access point.

An objective of the present invention is to provide an efficient, cost-effective technique for enabling multiple WBPDs to connect to a network.

A further object of the present invention is to provide a short-range wireless network that allows for easy network installation of relay points with minimal or no additional wiring.

Another object of the present invention is to provide a short-range wireless network that is easily scalable with minimal or no additional wiring.

Yet another object of the present invention is to provide a short-range wireless network in which little or no additional maintenance (such as battery replacement, adjustment of transmission power or location, etc.) of relay points is required for a substantially long time.

A further object of the present invention is to provide a short-range wireless network that is easily customized to accommodate a coverage area having a particular size and shape.

Still another object of the present invention is to provide a short-range wireless network that has a fixed network configuration but is easily changeable to another configuration.

An additional object of the present invention is to provide a short-range wireless network that serves a large number of users with a relatively constant data rate and set-up time for connection establishment.

Another object of the present invention is to provide a short-range wireless network that is scalable with only minimal degradation of set-up time for connection establishment and in data rate.

Objectives of the present invention are realized by providing a hierarchical topology having intermediary tiers between APs and end devices. These intermediary tiers are comprised of devices which are defined herein, and which are referred to as extension points (EPs). These EPs are designed as devices having low power consumption requirements, comparable with the power consumption of WBPDs. Connectivity is provided between EP devices, between EP and AP devices, and between EP and WBPD devices, using only short-range communication technologies. (In the preferred embodiment, radio frequency or "RF" technology is used, and in particular, Bluetooth technology.)

A high-gain directional antenna is added to a low-power radio on the EP device, which also has a conventional short-range omnidirectional Bluetooth antenna. The directional antenna enables the EP to be placed at a further distance from the AP than when using conventional Class 3 Bluetooth devices. (According to the preferred embodiment, the high-gain directional antenna enables the EP to transmit to an AP that is approximately 100 meters away.) The area of coverage provided by EPs may be balanced with the potential density of end devices by choosing a suitable spatial layout of the EPs.

A novel installation procedure for EPs is defined, wherein each EP dynamically tunes the beam of the directional antenna to optimize the bit error rate for communications with its upstream AP, and dynamically determines a power ratio that maintains connectivity with the AP while minimizing the power consumption of the EP (and while keeping the bit error rate within an acceptable range).

A table (or other data structure) is maintained that specifies the routes to particular end devices through the EPs of the hierarchical topology.

An alternative, portable source of energy is preferably used for powering up the EP devices. For example, a photovoltaic (PV) array or PV module may be used, which recharges using the incident lighting within the space in which the EP is located. The low efficiency of a collector panel when using incident light can be compensated for by enlarging the size of the collector panel.

BRIEF DESCRIPTION OF THE DRAWINGS

FIG. 9 depicts a table in which information may be stored regarding the current communication structure between EPs and APs, according to a preferred embodiment of the present invention.

DETAILED DESCRIPTION OF PREFERRED EMBODIMENT

The present invention will now be described more fully hereinafter with reference to the accompanying drawings, in which a preferred embodiment of the invention is shown. Like numbers refer to like elements throughout.

Flowchart illustrations of aspects of the present invention are described below. The logic of these flowcharts may be provided as methods, systems, and/or computer program instructions embodied on one or more computer readable media, according to an embodiment of the invention. As will be obvious to one of ordinary skill in the art, these flowcharts are merely illustrative of the manner in which the associated aspects of the present invention may be implemented, and changes may be made to the logic that is illustrated therein (for example, by altering the order of operations shown in some cases, by combining operations, etc.) without deviating from the inventive concepts disclosed herein.

The present invention provides an efficient, cost-effective technique for enabling multiple low-power wireless devices such as PDAs or wireless telephones to connect to a fast wired or wireless voice/data network.

Figure 1:
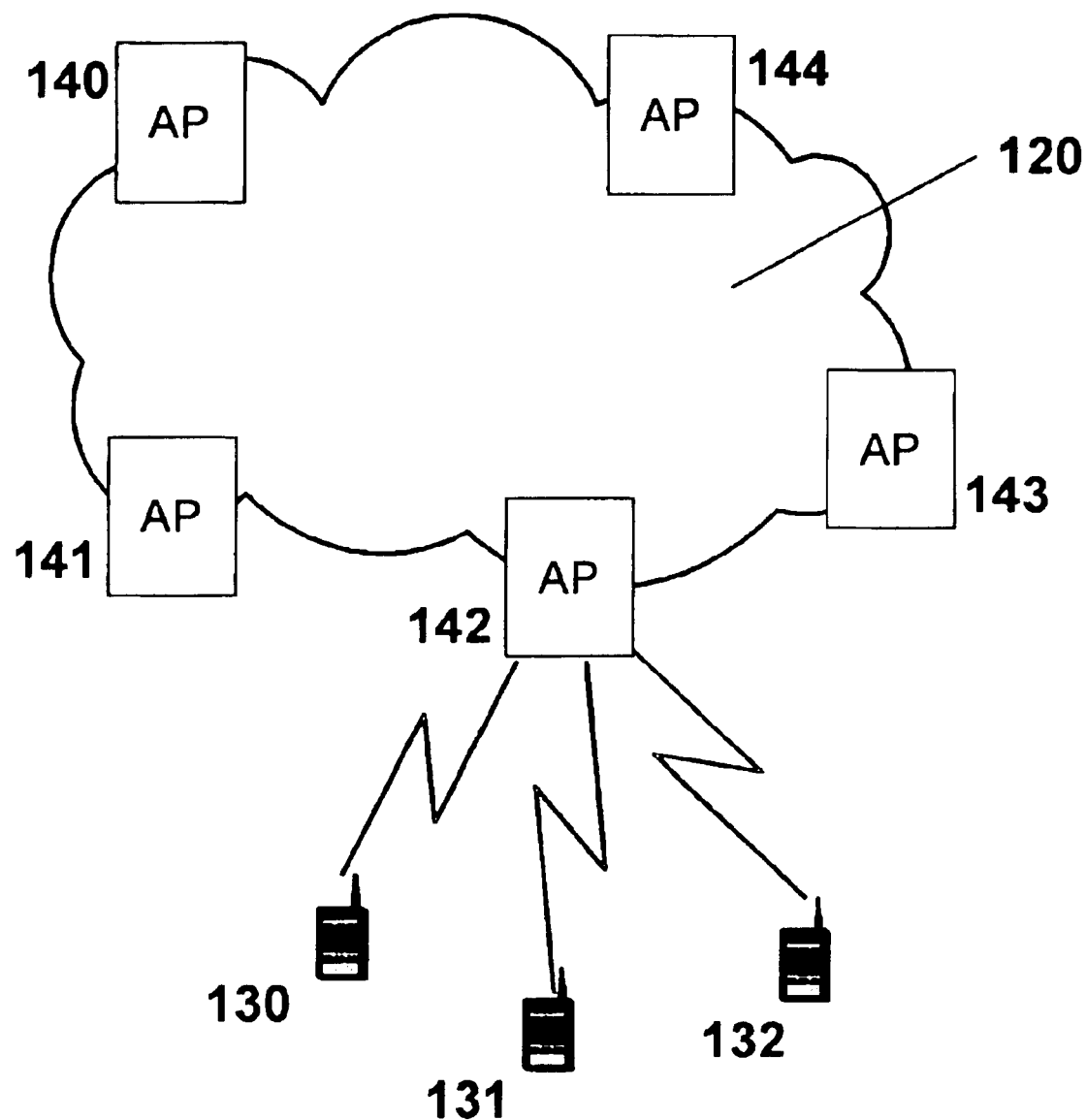
FIG. 1 illustrates use of an access point configuration used to connect end-user devices to a network, according to the prior art.
Figure 2:
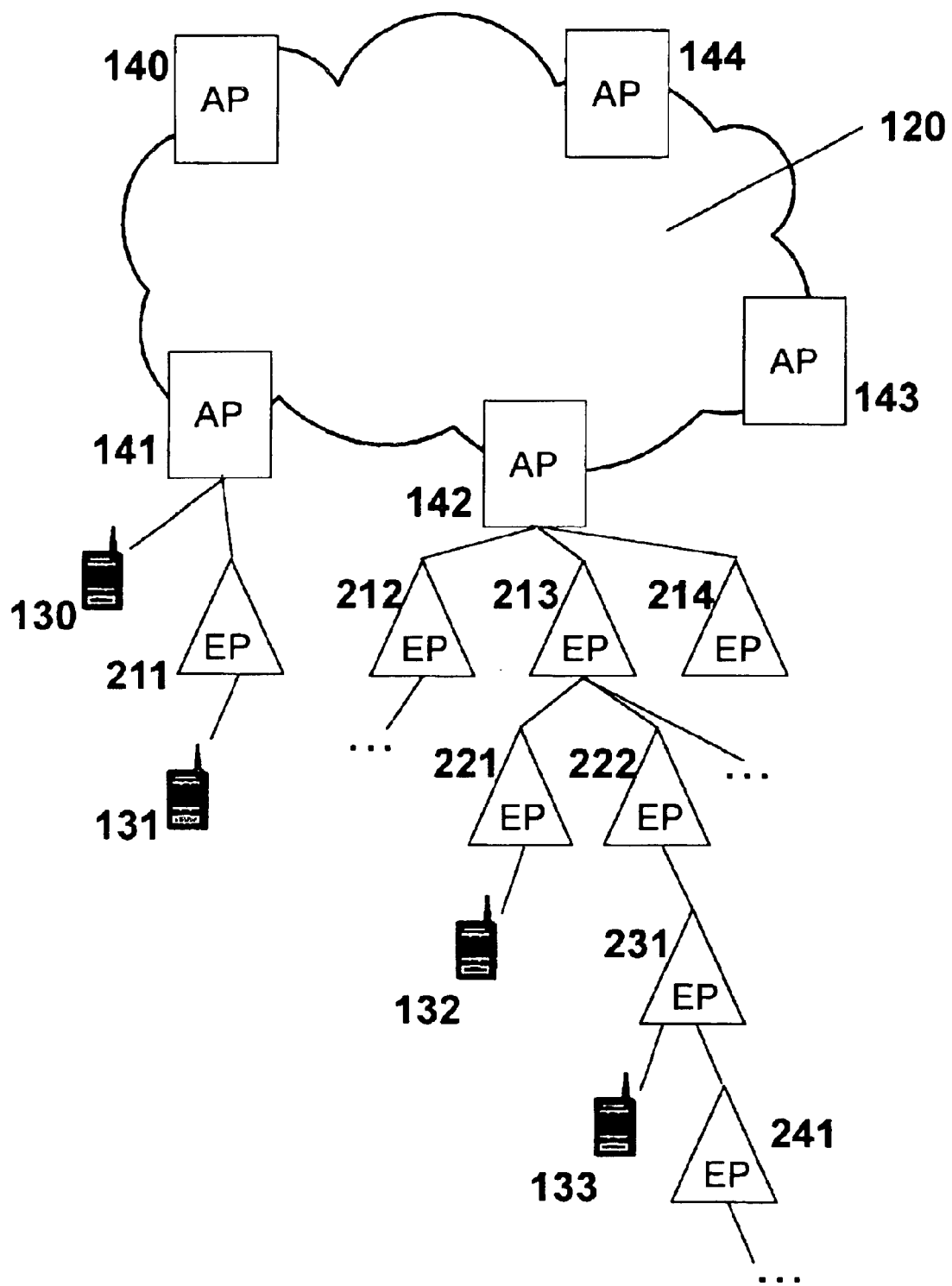
FIG. 2 depicts a configuration in which the extension points of the present invention are used to connect end-user devices to a network.

FIG. 2 illustrates the topology of a system in which the present invention operates, comprising some number of APs, EPs, and end user devices (or simply "end devices"). These AP, EP and end devices are structured generally in some number of tiers, with APs at the highest tier, EPs in the middle tiers, and end devices the lowest tier. As shown in FIG. 2, AP devices 140–144 of the prior art connect to a prior art network 120. There may be zero, one, or many middle tiers of EPs, depending on the needs of a particular environment in which the present invention is implemented. Thus, EP 211 is shown as a single middle tier between AP 141 of the upper tier and end device 131 of the lowest tier, while end device 130 is connected directly to AP 141 (without an intervening EP). In the preferred embodiment, Bluetooth is used as the underlying wireless network technology. EP 211 therefore functions in the master role for a piconet that has a single slave device 131. End devices 132 and 133 each belong to a piconet having a master represented by an EP one level higher in the topology (EPs 221 and 231, respectively).

In alternative embodiments, short-range technologies (which are preferably RF technologies, and which may be as yet undeveloped) other than Bluetooth may be used, without deviating from the scope of the present invention. (It will be obvious to one of ordinary skill in the art how the novel teachings disclosed herein are to be adapted to other such technologies.)

EPs 212, 213, 214 from a second tier of a multi-tier topology option, being located in the tier beneath AP 142. In turn, these second-tier EP devices may communicate with lower-tier EP devices, and thus EP 213 is shown as communicating with EPs 221, 222, etc., while EP 214 is not connected to any tiers in the downstream direction. A particular EP may be connected to end devices as well as to other lower-tier EPs, as shown for EP 231 and its lower-tier device 133 and EP 241.

The configuration in FIG. 2 is merely illustrative of the configurations that are possible when using the present invention. There may be more or fewer APs than shown in this example, as well as more or fewer EPs and tiers of EPs. When using Bluetooth, each EP (and each AP as well) may support from 0 to 7 devices comprising a combination of end devices and other lower-tier EPs.

End devices may establish a connection to a network such as network 120 via any AP or EP device reachable from that end device (provided, of course, that the AP or EP grants the request). For example, if a Bluetooth piconet of which EP 221 is the master has some number of active slave devices less than 7, then the piconet can theoretically add more slave devices. End device 133 might therefore join the piconet of EP 221, rather than the piconet of EP 231, if end device 133 can reach either EP. (In the general case, if an end device can reach several EPs and/or As belonging to the same or different piconets, then the end device's network connection can be established using any of the reachable EPs or APs.)

Preferably, the EP devices of the present invention use a photovoltaic (PV) array or module (commonly referred to as solar-powered batteries, although in the present context, this is not meant to imply a power source that is powered only by solar radiation), in order to recharge through use of an available light source such as the incident lighting in a room of a building. (Traditional alkaline batteries, rechargeable batteries, or other battery technologies may be used in alternative embodiments.) Each AP device may have a connection to an AC or DC power network.

Figure 3:
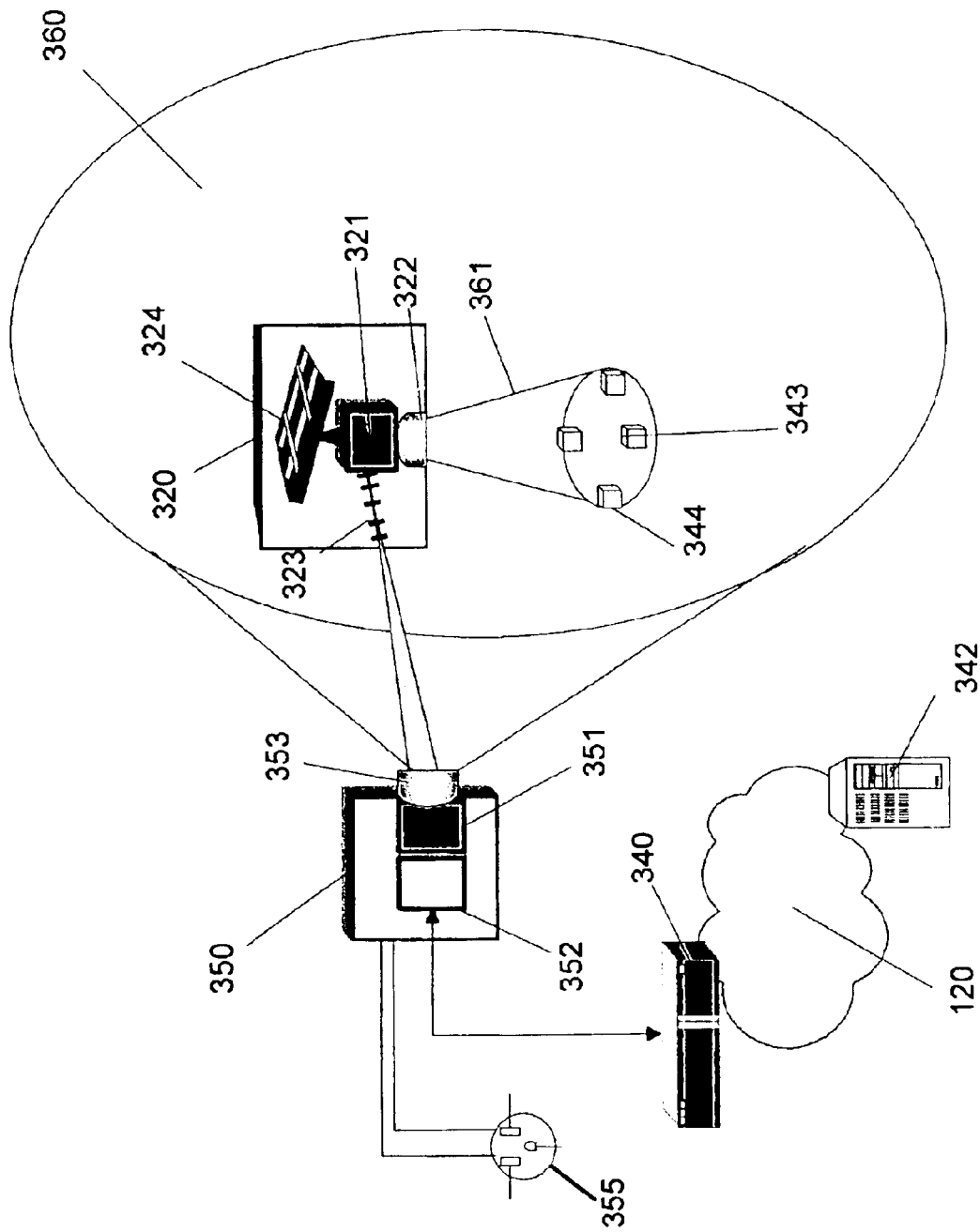
FIG. 3 illustrates the AP and EP devices in more detail, showing how these devices provide a network connection for multiple end devices, according to a preferred embodiment of the present invention.

Referring now to FIG. 3, the design characteristics of an EP and its connection to an AP and remote network are illustrated. In this example, EP 320 is coupled to AP 350. The AP 350 is communicating, via router 340 and network 120, with a remote server 342. As a result, end devices such as devices 343 and 344 can also communicate wirelessly with server 342.

AP 350 comprises a high-power wireless communication unit including a Bluetooth module 351, a network card 352, an omnidirectional high power antenna 353, and other components such as a processor, memory, and power supply (not shown in FIG. 3). Bluetooth module 351 and omnidirectional antenna 353 are used for communicating with EP 320, and other devices that may be located in the piconet shown generally as area 360. The network card 352 is used for communicating with router 340. Also, the AP is connected to an external power supply via a power plug 355.

AP 350 and EP 320 have radio receivers (not shown) of approximately equal sensitivity (preferably, −70 dBm). The transmitting power of the AP is typically 20 dBm, corresponding to Class 1 Bluetooth power requirements.

In the preferred embodiment, EP 320 includes a short-range wireless communication unit 321 (which is preferably a Bluetooth Class 3 module), an omnidirectional antenna 322, a directional antenna 323, and a rechargeable power supply utilizing a collector panel (shown at 324). Communication unit 321 enables the EP to communicate with AP 350 (using directional antenna 323) as well as with end devices and other EPs in its piconet (using omnidirectional antenna 322). The range of the piconet of EP 320 is shown generally as area 361.

The EPs of the preferred embodiment are designed as low-power devices with minimal processing capabilities (e.g., just enough processing capability to support functions up through the network layer of the Bluetooth protocol stack), and minimal power management tasks. These Bluetooth-based EPs are well suited for use with WBPDs, as communications unit 321 generates 70 dBm transmitting power and (through the omnidirectional antenna) covers a range limited to 10 meters. As a result, the EP has a power consumption similar to that of a typical end-user device. Collector panel 324 uses a less powerful rechargeable power device such as a PV array or module, which collects energy from the incident light of external light sources.

Because government regulations limit the total radiation allowed in each ISM band, both the power of the transmitter and the gain of the antenna must be considered. Directional antenna 323 (which may be a Yagi antenna, for example) is designed to provide about 20 dB gain in the direction of focus, therefore increasing the radiated power to be approximately equal to that emitted by AP Bluetooth devices, allowing it to reach distant AP receivers (that is, AP receivers which may be greater than 10 meters away, but less than or equal to 100 meters away).

During system installation, the narrow directional antenna 323 of the EP is oriented toward the omnidirectional antenna 353 of the AP. As a result, the range of an EP device (via the directional antenna 323) will now be comparable with the range of an AP (that is, approximately 100 meters). Consequently, the EP and AP can communicate to pass packets to and from the end devices that are communicating with the EP, thereby giving these end devices access to remote servers such as server 342. (The orientation procedure that is used during system installation will be described in more detail below, with reference to FIG. 7.)

Figure 4:
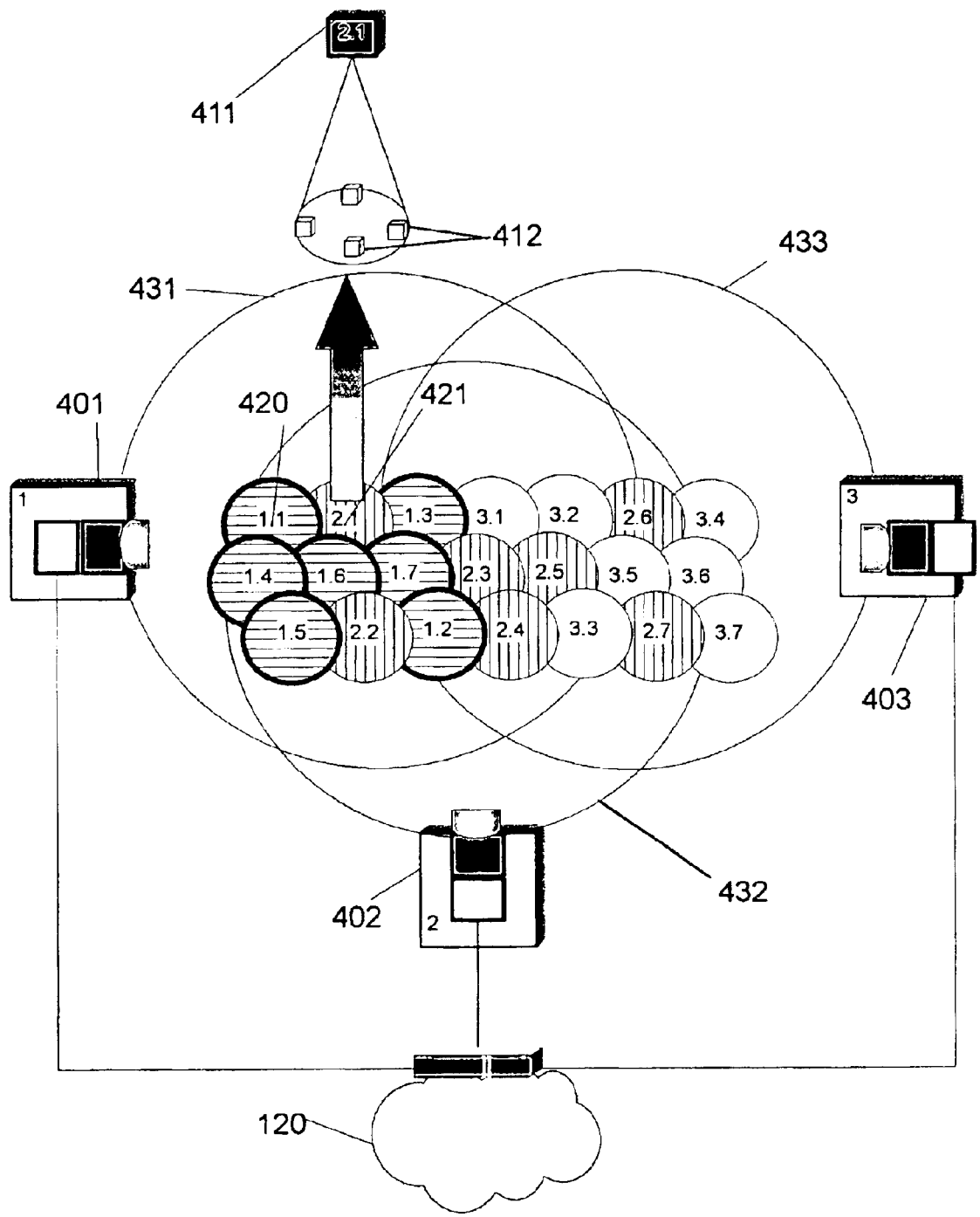
FIG. 4 illustrates a system in which APs communicate with end-user devices through an intermediate tier of EPs, according to a preferred embodiment of the present invention.

Referring now to FIG. 4, an example short-range wireless installation according to the present invention is shown which comprises multiple APs (shown as elements 401–403) and multiple EPs. Large circles 431, 432, 433 show working ranges of the APs 401, 402, 403, respectively. In the preferred embodiment, the working range has a 100 meter radius. The small circles (e.g. as shown at elements 420 and 421) show the working range of EPs when they use their omnidirectional antennas (having a 10 meter radius, in the preferred embodiment). For example, the circle 421 illustrates a short working range of EP 411. Each EP, when using the Bluetooth technology of the preferred embodiment, may serve up to 7 end devices. As an example, the end devices of EP 211 are depicted generally at 412.

An EP may be capable of communicating the multiple APs, but it only connects to one AP at a time (as will be discussed further in the context of FIG. 5). Preferably, a device providing a network control server function (not shown in FIG. 4) maintains a table or other data structure (referred to hereinafter as a table, for each of reference) that records the current EP-to-AP associations. This association information is used to route packets to end devices. FIG. 9, described below, illustrates an example table structure that may be used. The information in this table may be stored within each AP, or a centralized repository may be used as an alternative.

As an example of EP-to-AP associations that may be in effect, FIG. 4 uses the numbering scheme "1.x" and horizontal hash marks to denote the EP access ranges for all EP devices that are active members of a piconet controlled by AP device 401. Circles with the numbering scheme "2.x" and vertical hash marks denote the ranges of EP devices of a piconet where AP 402 is the master, and white circles numbered "3.x" belong to EP members of a piconet having AP 403 as the master.

The directional range of an AP may be wide enough to cover more than 7 EP devices. However, a limit of 7 EPs is enforced by the Bluetooth architecture of the preferred embodiment. The connection set-up procedure for an EP (depicted in FIG. 7 and described below) ensures that an AP device is connected primarily to the EP devices that are the closest to that AP, or that require the least power to transmit reliably to that AP. The power consumption of the EP is therefore reduced accordingly. As a result of this set-up procedure, AP 401 communicates with all end devices in the areas 1.1–1.7 via the corresponding EP devices. Similarly, AP 402 communicates with all end devices in the areas 2.1–2.7, and AP 403 communicates with all end devices in the areas 3.1–3.7.

Depending on performance requirements of a particular environment in which the present invention is used, it may be necessary to add more APs. The example configuration shown in FIG. 4 may serve 147 end devices simultaneously with a data rate of 14 Kpbs per device. (That number of end devices is computed as follows: (1) each of the 3 APs may support up to 7 EPs, for a total of 21 EPs; and (2) each of these 21 EPs may support up to 7 end devices, for a total of 147 end devices. The data rate is computed by dividing the 720 Kbps capacity of each AP by the 49 end devices which are supported by that AP.) The system shown in FIG. 4 can support only 9 synchronous connection-oriented (SCO) voice channels from those 147 devices. (The Bluetooth technology places a limit of 3 on the number of voice channels supported by a Class 1 device at one time. Thus, the 3 APs in this example configuration can support a maximum of 9 such channels.) In an environment where SCO channels are in use, each AP can support approximately 400 Kbps using asynchronous connection-less (ACL) connections (according to the aforementioned limitations prescribed in the Bluetooth specification). The resulting performance of each active and device will therefore be in the range of 8 Kbps, as each AP may serve up to 49 active end devices in this example configuration. If more AP devices are used, or if fewer EP devices are present, the data rate will be increased.

While FIG. 4 shows only a two-tier architecture for the wireless network (that is, an architecture having one tier of APs and another tier of EPs), configurations with more tiers are also possible. (See the discussion of FIG. 8, below.) This would be appropriate in two situations:

1) In order to reallocate bandwidth to support high bandwidth connections, for example by having some second-tier EPs be designated for direct use by high-bandwidth end devices while other second-tier EPs support third-tier EPs which, in turn, support low-bandwidth end devices. In a situation such as this where the end devices are grouped according to their bandwidth usage characteristics, the AP can pre-allocate bandwidth among the different second-tier EPs for more efficient operation.

2) To support more users. For example, as long as the data rate may go as low as 3 Kbps without causing problems (and no more than 3 simultaneous voice channels are required), a single AP using a three-tier topology could support the same number of devices supported by the 3 APs and two-tier topology shown in FIG. 4. In this case, the AP will communicate with 3 EP devices on the next lower logical tier, and each of these EP devices will be used to connect with 7 more EP devices on the next lower tier. Each of these 21 EPs is capable of supporting up to 7 end devices, for a total of 147. In this manner, a total of 147 end devices can be supported from a single AP. (A drawback to this approach is that network set-up time and network latency grow as the number of tiers increases.) The total number of end devices that an AP can support in such a three-tier topology is 343, because the AP communicates with seven EPs, each communicating with seven EPs at the next tier (for a total of 49 EPs at this lower tier), each communicating with 7 end devices.

Figure 5:
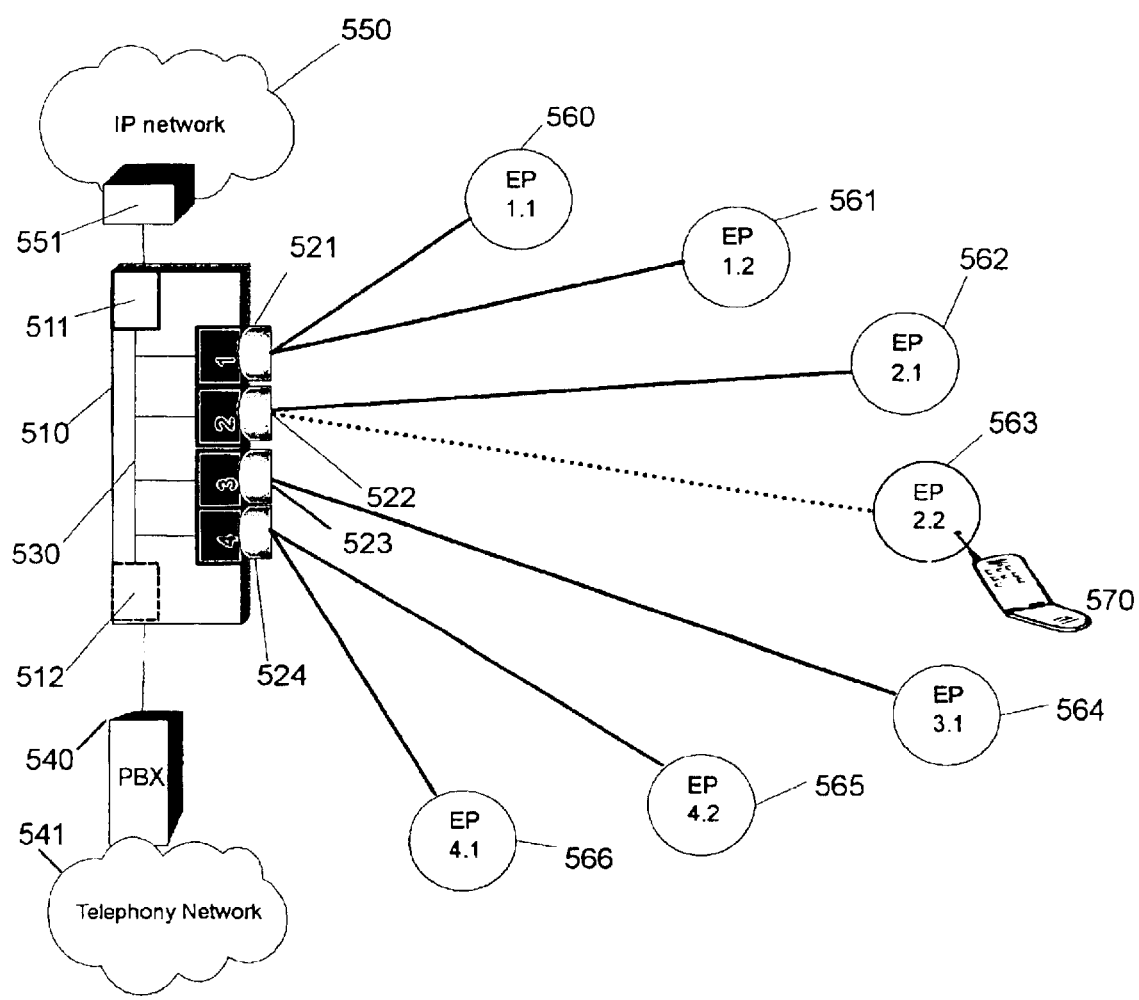
FIG. 5 illustrates a voice/data unit in which multiple APs are located to provide communications between a voice network and/or a data network and multiple EPs and/or multiple end-user devices, according to an embodiment of the present invention.

FIG. 5 illustrates another embodiment of the present invention in conjunction with both voice transmission and data transmission between devices, data networks, and telephony networks. A voice/data unit 510 includes several Bluetooth devices (shown as 521, 522, 523, and 524 in this example) functioning as APs, a network card 511, and a digital voice multiplexer 512. An internal bus 530 feeds the ACL data to the network card 511 and to the multiplexer 512. The multiplexer separates the voice channels and sends them to PBX unit 540, preferably via a T1 connection. The T1 connection may in turn be connected to a central office switch on PSTN (public switched telephony network) 541.

Network card 511 provides IP data flow to IP network 550. A network control server function in a server 551 coordinates the flow of IP traffic.

The gray circles 560–566 illustrate working ranges of EP devices numbered as EP 1.1, EP 2.1, and so forth. Assume that all EP devices except for EP 563 are handling one active phone conversation, and that EP 563 is idle. AP 521 is connected to EPs 560 and 561, AP 522 is connected to EP 562, AP 523 is connected to EP 564, and AP 524 is connected to EPs 565 and 566. Now assume that a new end device 570 enters the range of EP 563. To support this device, the EP should establish a connection with one of the four AP devices 521, 522, 523, or 524. Several techniques can be used to determine which AP should be associated with the EP in order to avoid over-burdening any of the APs (and consequently denying service). In the preferred embodiment, the EP device 563 requests a connection with all of the AP devices 521, 522, 523, and 524. EP 563 then completes the connection with the AP that accepts the connection first. Because in practice the AP devices are not synchronized with each other, a random choice of AP is assured, and because the EP only connects with an AP that accepts the connection request, it is sure not to over-burden the AP with which it communicates.

Figure 6:
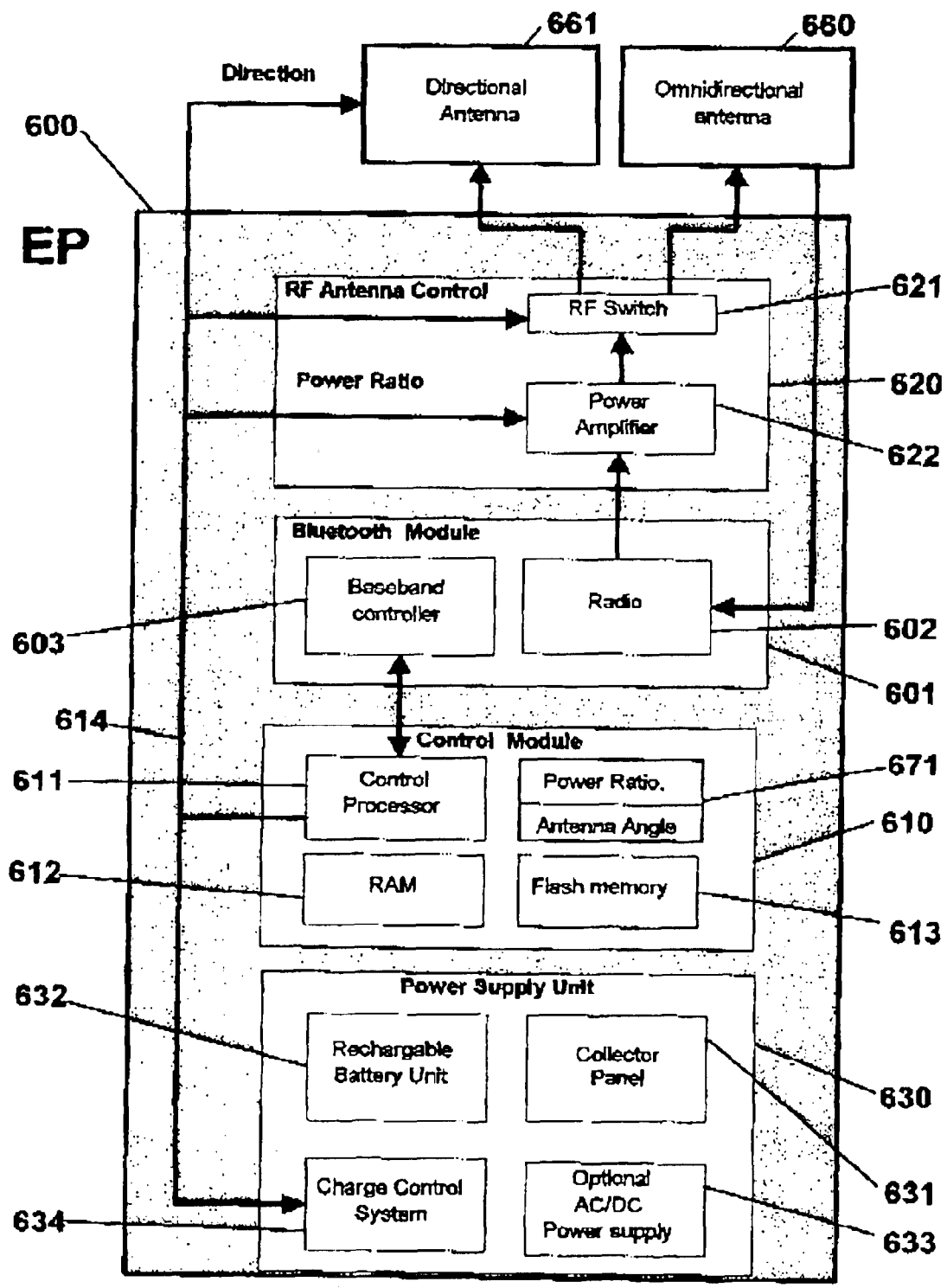
FIG. 6 depicts the architecture of an EP, according to a preferred embodiment of the present invention.

FIG. 6 illustrates an architecture of an EP 600. Those components and features of an EP that relates to the present invention will now be discussed. (Other components and features which use prior art technology will not be described in detail herein.)

Bluetooth module 601 is preferably a conventional Bluetooth radio 602, and baseband controller 603. Control module 610 provides overall control of the load on EP antennas 661 and 660, the power functions, and some Bluetooth protocol features which are not handled by a standard Bluetooth radio (such as higher-layer Bluetooth protocol stack functions which do not require the radio, including RFCOMM, Service Discovery Protocol, and the Host Controller Interface). RF antenna control module 620 is a switching mechanism for switching between the directional antenna 661 and omnidirectional antenna 660. Power supply unit 630 supplies power for operation of the EP 600.

The radio output of the Bluetooth module 601 is amplified by the power amplifier 622 and, via the RF demultiplexor or switch 621, is fed to one of the antennas 660 or 661. The control processor 611 controls 614 the amplification ratio and switching direction.

The optimal amplification ratio is determined during system installation (or perhaps during subsequent troubleshooting) to provide a signal that is transmitted from EP 600 and received by an AP device while having a minimal bit error rate (BER). During installation, the Bluetooth transmitter power is preferably set initially to its maximum value, and a tuning process is then performed which reduces the transmission ratio until reaching an optimal level (as will be described with reference to FIG. 7). The control processor 611 utilizes this ratio until completion of the tuning process.

Based on input from control processor 611, demultiplexor 621 connects the output of the power amplifier to (1) the directional antenna 661 feeder for all the transmissions between an AP and EP, or between an EP and other EP devices, and to (2) the omnidirectional antenna 660 feeder for transmissions between an EP and end devices.

The native radio amplifier (not shown) within the radio 602 of Bluetooth module 601 dynamically adjusts the power of the radio output to keep the BER below a threshold value prescribed by the Bluetooth specifications, as in Bluetooth modules of the prior art.

Power supply unit 630 includes a rechargeable battery unit 632 and a charge control system 634. Based on the measurements of current supplied by collector panel 631, and depending on the power consumption of the EP, control processor 611 varies the current which is received from the collector panel 631, thereby compensating the power consumed by the system and keeping the current below the threshold specified for battery charging by the battery manufacturer.

An EP installation procedure includes the set-up of the nominal power of transmission, and pointing the directional antenna toward an AP. The installation procedure determines the nominal power and proper direction for the antenna dynamically, in a manner that is targeted to achieve reliable communication between the AP and EP with minimal EP radio transmission power. A power ratio "R" determines the amplification of the power amplifier 622, and an angle "A" characterizes the position of the directional antenna beam relevant to the base of the EP. The values for power ratio R and directional angle A are preferably stored in a non-volatile memory 671, and may be changed during a new installation or tuning process.

Figure 7B:
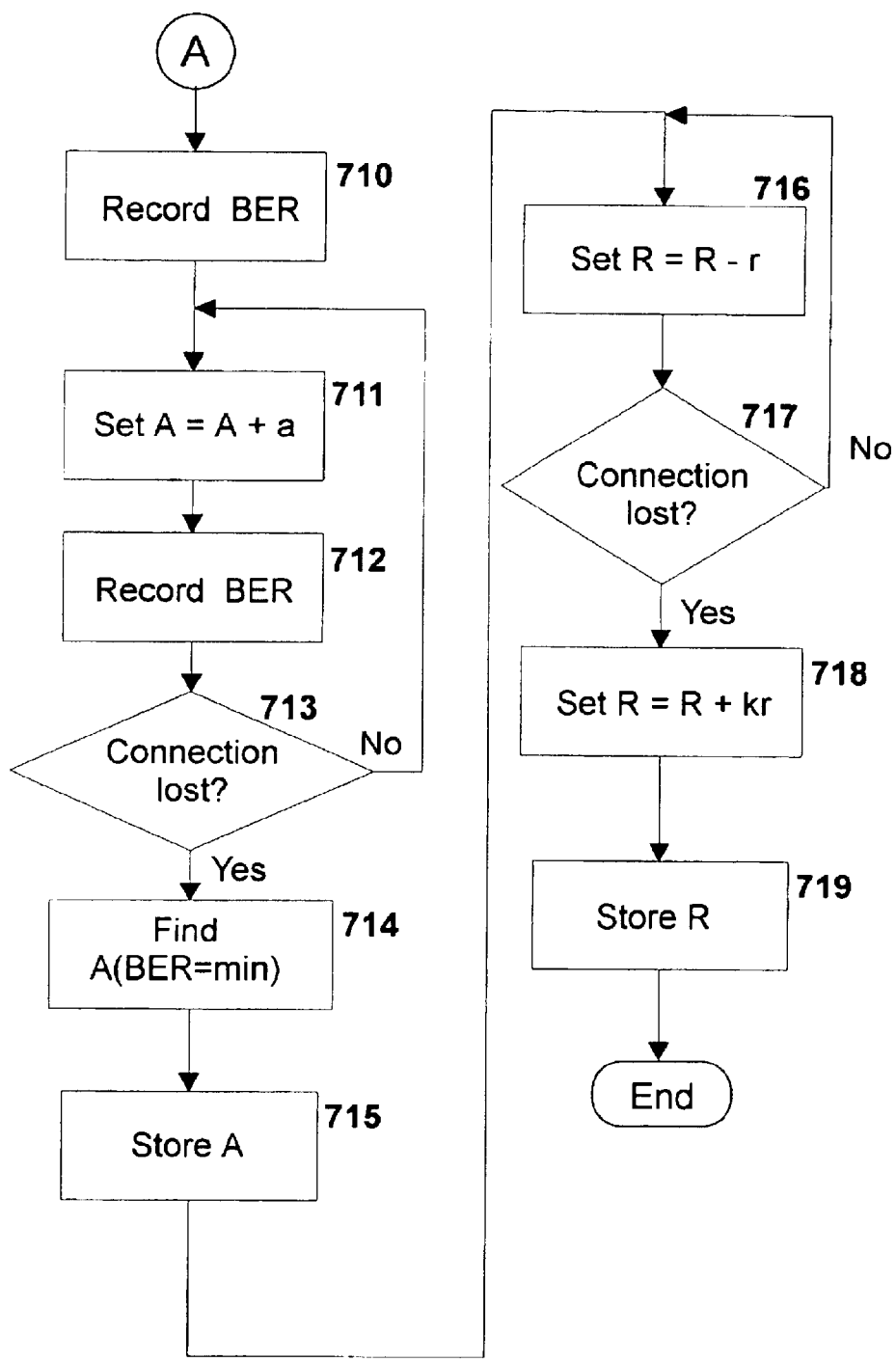
FIG. 7 provides a flowchart that depicts the logic with which an EP is installed in an infrastructure, according to a preferred embodiment of the present invention.

FIG. 7 provides a flowchart depicting the logic that may be used for the EP installation procedure, according to the preferred embodiment. The procedure involves first positioning the directional antenna (element 661 of FIG. 6) at the edge of the usable angle for communicating with the AP. Having done this, the EP determines the angle A that provides the lowest BER. Finally, the EP determines the minimal power R that is required to maintain connectivity with the AP. The installation process is performed for the EPs at the highest tier, which communicate directly with APs, as well as for those EPs in intermediate tiers which communicate with another upstream EP as if the upstream EP was an AP. (Thus, references in the description of FIG. 7 to communicating with an AP are intended to include actual AP devices as well as these upstream EPs.)

The process begins at Block 701, where the power ratio R is set to 100 percent (providing the maximum transmission power of the EP) and the angle A is set to 0 (establishing a starting position for the directional antenna). In an alternative approach to tuning the power ratio, the value of R may be set to 50 percent in Block 701, representing the midrange of the transmission power of the EP (with corresponding modifications to the logic in Blocks 716–719). Or, other initial values may be used as a starting point, as desired in a particular implementation of the present invention.

At Block 702, the EP requests a connection with an AP. The EP processor checks to see if a connection with the AP is established (Block 703). If the test in Block 703 has a negative result (i.e. the connection is not established), then at Block 704 the EP beam direction is changed by a small angle "a" in a particular predetermined direction (e.g. counterclockwise). Control then results to Block 702 to re-attempt connection with the AP.

For simplicity, the direction of the beam is rotated only around the vertical dimension, so that only one angle is applicable to the tuning and positioning procedure; alternative embodiments of the present invention may rotate the beam along multiple axes, as will be evident to those skilled in the art. While the direction of the beam may be changed by several means, including manually (e.g. by hand) or automatically (e.g. by using a step motor or capacitance array), the specific method used does not form part of the present invention and is not illustrated in detail herein.

Block 705 is reached when the test in Block 703 has a positive result (i.e. the connection with the AP is established). Blocks 705 and 706 then performs an iterative process of determining how far the antenna can move while still remaining connected to the AP. Thus, Block 705 moves the EP directional beam again in the same predetermined direction, by the same angle "a". Block 706 tests to see if the connection has now been broken. If not, control returns to Block 705 to change the angle again. When the connection breaks, the test in Block 706 has a positive result and control reaches Block 707. Blocks 707–709 perform an iterative process to return to the edge of the usable angle. At Block 707, the EP directional beam moves in the opposite direction, by the sample angle "a". At Block 708, the EP requests connection to the AP. Block 709 checks to see if the connection is (re)established. If not, control returns to Block 707 to move the antenna again; otherwise, when the connection is established, it means that the antenna beam is now on the edge of the usable, and processing continues at Block 710.

It should be noted that the sequence of steps in Blocks 702 through 709 supports the possibility that the antenna is initially positioned within contact with the AP. If the antenna is not initially positioned within contact with the AP, then these steps can be optimized as a single direction sweep until it first comes in contact with the AP.

At Block 710, the processor measures the BER of a test sequence sent by the AP and stores this measured value. This BER is preferably stored in a two-dimensional table which shows the BER as a function of the current value of angle A. Blocks 711–713 then try other angles in an iterative manner to see what the BER of those angles is, such that the angle providing the lowest BER can be selected. At Block 711, the beam angle is changed again, in the same direction as in Block 707. Block 712 records the BER of this value of angle A, and Block 713 then tests to see whether connectivity with the AP has been lost. (For purposes of Blocks 713 and 717, connectivity is considered to be lost when either (1) no communication is possible or (2) the encountered BER exceeds some threshold.) If so, then the angle of the directional antenna has been changed too far, and control transfers to Block 714 to determine the most suitable angle to use; otherwise, control returns to Block 711 to repeat the movement of the beam and testing of the BER.

Testing of the BER as a function of angle A, and using this information to determine an optimum angle for the directional antenna on the EP device, are novel teachings of the present invention. The calculation of BER values, as implemented by the native Bluetooth protocol, may be used as the antenna angle is being repeatedly changed. (Note that while the Bluetooth specification teaches computing a BER value, once the value is within the range required by the specification no further movements or tests are performed in the prior art technique. The present invention, on the other hand, continues to perform tests to determine the proper angle adjustment.)

Upon reaching Block 714, connectivity with the AP has been lost. The processor thus searches through the pairs of (angle A, BER) information that were recorded at blocks 710 and 712, in order to find an angle whose corresponding BER is minimal. The value of angle A from the pair thus located is recorded in non-volatile memory (such as non-volatile memory 671 depicted in FIG. 6) at Block 715. The antenna is then re-positioned to angle A before continuing at Block 716.

Blocks 716 and 717 then iteratively determine the minimal power ratio R required to maintain connectivity with the AP (and thereby minimize the EP's power consumption). Recall that a default value to use as a starting point was set in Block 700. At Block 716, the EP processor reduces its transmission power by some small step "r" as the AP continues to transmit a test pattern. Block 717 checks to see if connectivity has been lost. If not, control returns to Block 716 to reduce the power yet again. This reducing of the power and checking the connectivity continues until the connection is lost, at which time control transfer to Block 718.

Upon reaching Block 718, the current power ratio R yields an unacceptable BER, so a constant "k" is used to increase the power and ensure that the transmitting power will stay at a level sufficient for reliable communication. In actual practice, the value of "r" is chosen so that the precision of measurement will be sufficient to determine the proper value for R under a minimal number of steps with the standard noise power (which is predetermined in the Bluetooth specification). The number "k" is chosen to provide sufficient reliability of transmission without a substantial increase in power consumption (and is therefore an engineering decision).

At Block 719, the value of power ratio R is preferably stored in non-volatile memory along with the value of angle A, and the installation procedure of FIG. 7 then ends. The EP is now ready for establishing connections with end devices. (Note that the tuning procedure described with reference to FIG. 7 may also be used for end devices, when those devices have a directional antenna.)

Figure 8:
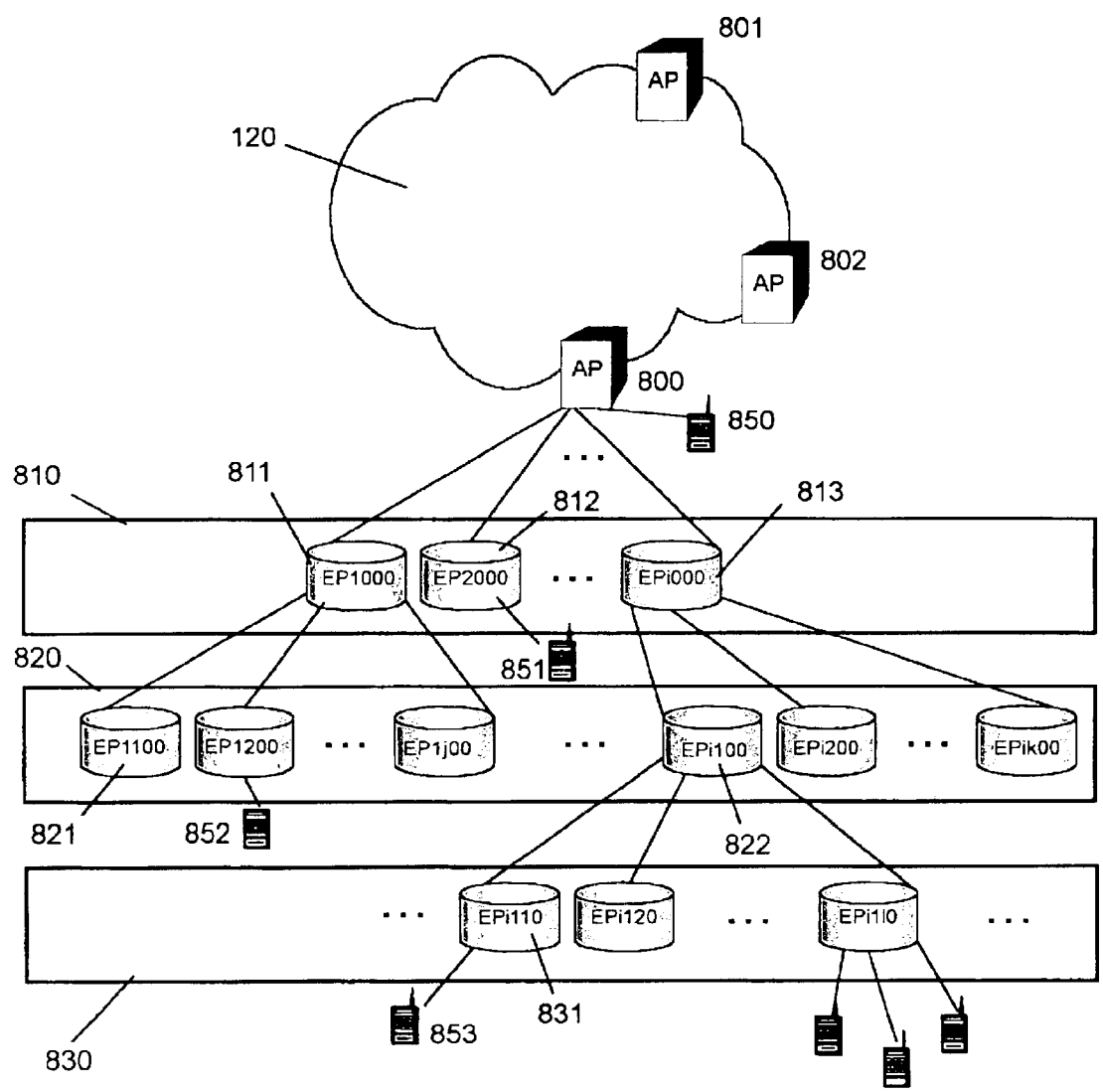
FIG. 8 illustrates a multi-tier layout using EPs, and the connections between them, that may be provided according to an embodiment of the present invention.

Referring now to FIG. 8, a configuration is shown for a possible layout and connections between tiers of EP devices. This example shows three intermediate tiers of EP devices, designated by reference numbers 810, 820, and 830. AP device 800 represents the upper tier of this configuration. AP 800 serves as a master of the piconet which includes the EP devices comprising tier 810.

For simplicity of illustration, all EP devices in FIG. 8 are assigned a four digit number sequence that describes the path between that EP and the AP. The first non-zero digit represents the Bluetooth device address ("BD_ADDR") of the EP that is directly communicating with the AP; subsequent digits designate EPs along the path communicating with the EP identified by the previous digit. Thus, the number 1000 refers to the BD_ADDR of EP 811 connected to AP 800; the number 2000 refers to the $BD_{13}$ ADDR of second EP 812 connected to AP 800; etc., and "i000" refers to the BD_ADDR of the i-th EP 813 connected to AP 800. (Recall that in the Bluetooth environment of the preferred embodiment, values for the "i", "j", "k" and "l" of FIG. 8 are all less than or equal to 7.)

Likewise, the sequence 1100 represents the BD_ADDR of EP 821 connected to the EP identified by 1000 (because EP 1000 is a master of a piconet in tier 820, which includes EP 1100). If tier 820 includes "i" piconets with "i" masters on the upper tier 810, then the last EP in the "i-th" piconet will have a number ik00.

Considering that end devices sporadically request services from a closely located EP or AP in practice, a centralized control mechanism is preferably provided for use by the EP and AP devices. In the preferred embodiment, a network control server function is utilized, which supports a table (or other equivalent data structure) representing the current communication structure between EPs and APs. Each EP or AP preferably has a unique record, referred to herein as an "extension point parameters block" or "EP_PB", in this table. The EP_PB table may be used for a number of purposes, including provision of information to applications that are concerned with locations of (and routes to) the end devices.

FIG. 9 illustrates a preferred embodiment of the structure of the table 900 that stores the EP_BP records. For purposes of illustration but not of limitation, the table is shown as having four fields. These fields will now be described in more detail.

Field 902 stores the routing path, where "a1, a2, a3, . . . a(i-1)" represents the BD_ADDR fields of the routing path of data flowing between this EP or AP device and the AP master at the top of the hierarchical topology. (The sequence a1, a2, . . . corresponds to the numerical identifiers assigned to EPs, as shown in FIG. 8.)

Optional field 903 stores 3-dimensional coordinates of the EP or AP device, which in the preferred embodiment are either earth coordinates or local coordinates that are relative to the zero coordinates in this particular installation. Those coordinates are established during installation of the device (using prior art techniques).

Optional fields 904 and 905 represent the load on this EP or AP device. In the preferred embodiment, this comprises a specification of the number of SCO links and ACL links that are active at this device, respectively.

Referring again to FIG. 8, EPs may communicate with other EPs. This communication may happen in two ways. First, an EP may communicate with another EP using their omnidirectional antennas (as in standard Bluetooth communications). For example, device EP1000 (element 811) may communicate with device EP1100 (element 821), where EP1100 is a member of a piconet for which EP1000 is the master. Second, a lower-tier EP may use its directional antenna to communicate with a higher-tier EP. From this point of view, the lower-tier EP would not see a difference between talking to the higher-tier EP and talking to a standard AP. As an example (not illustrated in FIG. 8), EP device i110 (element 831) may communicate directly with EP device i000 (element 813), without passing the communications through intermediate EP device i100 (element 822). (This second type of communication is not strictly limited to EPs that are in different hierarchical tiers. For example, device EP1100 may communicate with device EPi100 using its directional antenna, if desired, even though these devices are shown as being in the same logical tier.)

Commonly-assigned U.S. Pat. Nos. 6,633,761 (Ser. No. 09/637,742, filed Aug. 11, 2000) and 6,691,227 (Ser. No. 09/657,745, filed Sep. 8, 2000), which are titled "Enabling Seamless User Mobility in a Short-Range Wireless Networking Environment" and "Location-Independent Packet Routing and Secure Access in a Short-Range Wireless Networking Environment", respectively, deal with providing seamless network connectivity by having access points coordinate with a core server to perform various functions and with providing transparent address translation as a client device roams through a short-range wireless networking environment. The network control server functionality described in the present invention may be co-located with either, or both, the core server and the routing table coordinator of these commonly-assigned inventions.

As has been demonstrated, the present invention provides a number of advantages over prior art solutions for connecting WBPDs to remote networks. Wireless EPs are defined and are used to relay information between APs and end devices. Minimal or no additional wiring is needed to add the wireless EPs to an infrastructure. Maintenance, such as replacing the rechargeable power supply or batteries, adjusting transmission power, and adjusting location of EPs for covering a fixed area, should need to be done quite infrequently. (It is anticipated that maintenance will be limited to replacement of batteries, which should be required no more often than once per year.) Customizing the topology of an installation is simple and inexpensive when using the present invention: Existing EPs may be moved, or additional EPs added, with no change (or at worst, with at minor about of change) to the physical wiring. Furthermore, such changes require a simple reconfiguration process wherein the installation set-up procedure is repeated. A novel tuning technique is used for EP installation, wherein the EP dynamically learns the best angle and power ratio for communicating with its AP. A larger number of WBPDs can be supported efficiently than when using prior art solutions, yet the connection establishment time and data rate do not suffer the degradation that occurs in prior art scatternet systems.

The foregoing description of a preferred embodiment is for purposes of illustrating the present invention, and is not to be construed as limiting thereof. Although a preferred embodiment has been described, it will be obvious to those of skill in the art that many modifications to this preferred embodiment are possible without materially deviating from the novel teachings and advantages of this invention as disclosed herein. Accordingly, all such modifications are intended to be within the scope of the present invention, which is limited only by the claims hereafter presented (and their equivalents).

That which is claimed is:

1. In a short-range wireless networking environment, a method of enabling communication between at least one end device and at least one application server, comprising the steps of:

providing at least one access point (AP), wherein each of the APs is adapted for communicating over at least one short-range wireless connection and at least one network connection;

providing at least one extension point (EP), wherein:
each of the EPs has a directional antenna and an omnidirectional antenna, each of the antennas adapted for short-range wireless connections; and
at least one of the EPs communicates with one of the APs, using one of the at least one short-range wireless connections of the AP and the directional antenna of the EP, and also with at least one selected one of the end devices, using the omnidirectional antenna of the EP; and transmitting traffic between a selected one of the application serves and the at least one selected one of the end devices, wherein the transmitted traffic flows between the selected application server and the AP using one of the at least one network connections of the AP, between the AP and a selected EP with which the AP is communicating and with which the at least one selected end device is also communicating, and between the selected EP and the at least one selected end device.

2. The method according to claim 1, wherein a short-range wireless link established using the omnidirectional antenna uses a protocol known as "Bluetooth".

3. The method according to claim 1, wherein the directional antenna of at least one of the EPs is used to communicate with another one of the EPs.

4. The method according to claim 1, wherein the omnidirectional antenna of at least one of the EPs is used to communicate with another one of the EPs.

5. The method according to claim 1, wherein each EP is powered using a photovoltaic array or photovoltaic module.

6. The method according to claim 1, wherein each EP comprises an antenna controller, an amplifier, a power supply, and a short-range communication function.

7. The method according to claim 6, wherein the short-range communication function is a Bluetooth module.

8. The method according to claim 1, wherein each EP comprises an antenna controller, an amplifier, a power supply and a short-range radio frequency communication module.

9. The method according to claim 8, wherein the short-range radio frequency communication module is a Bluetooth module.

10. The method according to claim 1, further comprising the step of providing a connection table which maintains a plurality of EP parameter blocks, each of the EP parameter blocks describing a route between one of the APs at a top level of a hierarchical connection structure and a selected one of the EPs, or a different one of the APs, which is communicably coupled to the AP at the top level.

11. The method according to claim 10, wherein the connection table is provided at a network control server.

12. The method according to claim 10, wherein the EP parameter blocks further describe a earth or local coordinates of the selected EP or the different AP.

13. The method according to claim 1, wherein a position of the directional antenna is set to minimize a bit error rate of the wireless connection.

14. The method according to claim 13, further comprising the step of dynamically determining the position of the directional antenna, further comprising the steps of:
    positioning the direction antenna of the at least one EP at a plurality of angles toward an omnidirectional antenna of the AP;
    recording the bit error rate at each of the angles; and
    selecting that one of the angles which exhibits a minimal value of the bit error rate, while still maintaining the connection, to be the position of the directional antenna.

15. The method according to claim 14, wherein the plurality of angles are selected by first locating an initial position beyond which communication using the directional antenna is not possible.

16. The method according to claim 1, wherein a power of transmission of the directional antenna is set to a minimum value required to communicate on the wireless connection.

17. The method according to claim 16, further comprising the steps of dynamically determining the power of transmission of the directional antenna, further comprising the steps of:
    establishing a default value for the power of transmission;
    recording a bit error rate at the default value;
    successively reducing the power of transmission until connectivity is lost or the bit error rate crosses a threshold; and
    setting the power of transmission to be value that results in the bit error rate staying below the threshold while still maintaining the connection.

18. The method according to claim 17, wherein the threshold is a maximum acceptable value for the bit error rate.

19. Computer program instructions embodied on one or more computer-readable media, the computer program instructions adapted for enabling communication between at least one end device and at least one application server in a short-range wireless networking environment and comprising:
    computer program instructions for communicating with at least one access point (AP), wherein each of APs is adapted for communicating over at least one short-range wireless connection and at least one network connection;
    computer program instructions for communicating with at least one extension point (EP), wherein:
        each of the EPs has a directional antenna and an omnidirectional antenna, each of the antennas adapted for short-range wireless connections; and
        at least one of the EPs communicates with one of the APs, using one of the at least one short-range wireless connections of the AP and the directional antenna of the EP, and also with at least one selected one of the end devices, using the omnidirectional antenna of the EP; and
    computer program instructions for transmitting traffic between a selected one of the application servers and the at least one selected one of the end devices, wherein the transmitted traffic flows between the selected application server and the AP using one of the at least one network connections of the AP, between the AP and a selected EP with which the AP is communicating and with which the at least one selected end device is also communicating, and between the selected EP and the at least one selected end device.

20. The computer program instructions according to claim 19, wherein a short-range wireless link established using the omnidirectional antenna uses a protocol known as "Bluetooth".

21. The computer program instructions according to claim 19, wherein the directional antenna of at least one of the EPs is used to communicate with another one of the EPs.

22. The computer program instructions according to claim 19, wherein the omnidirectional antenna of at least one of the EPs is used to communicate with another one of the EPs.

23. The computer program instructions according to claim 19, wherein each EP is powered using a photovoltaic array or photovoltaic module.

24. The computer program instructions according to claim 19, wherein each EP comprises an antenna controller, an amplifier, a power supply, and a short-range communication function.

25. The computer program instructions according to claim 24, wherein the short-range communication function is a Bluetooth module.

26. The computer program instructions according to claim 19, wherein each EP comprises an antenna controller, an amplifier, a power supply, and a short-range radio frequency communication module.

27. The computer program instructions according to claim 26, wherein the short-range radio frequency communication module is a Bluetooth module.

28. The computer program instructions according to claim 19, further comprising computer program instructions for providing a connection table which maintains a plurality of EP parameter blocks, each of the EP parameter blocks describing a route between one of the APs at a top level of a hierarchical connection structure and a selected one of the EPs, or a different one of the APs, which is communication coupled to the AP at the top level.

29. The computer program instructions according to claim 28, wherein the connection table is provided at a network control server.

30. The computer program instructions according to claim 28, wherein the EP parameter blocks further describe earth or local coordinates of the selected EP or the different AP.

31. The computer program instructions according to claim 19, wherein a position of the directional antenna is set to minimize a bit error rate of the wireless connection.

32. The computer program instructions according to claim 31, further comprising computer program instructions for dynamically determining the position of the directional antenna, further comprising:

computer program instructions for positioning the directional antenna of the least one EP at a plurality of angles toward an omnidirectional antenna of the AP;

computer program instructions for recording the bit error rate at each of the angles; and computer program instructions for selecting that one of the angles which exhibits a minimal value of the bit error rate, while still maintaining the connection, to be the position of the directional antenna.

33. The computer program instructions according to claim 32, wherein the plurality of angles are selected by first locating an initial position beyond which communication using the directional antenna is not possible.

34. The computer program instructions according to claim 19, wherein a power of transmission of the directional antenna is set to a minimum value required to communicate on the wireless connection.

35. The computer program instructions according to claim 34, further comprising computer program instructions for dynamically determining the power of transmission of the directional antenna, further comprising:

computer program instructions for establishing a default value for the power of transmission;

computer program instructions for recording a bit error rate at the default value;

computer program instructions for successively reducing the power of transmission until the bit error rate crosses a threshold; and computer program instructions for setting the power of transmission to be a value that results in the bit error rate staying below the threshold while still maintaining the connection.

36. The computer program instructions according to claim 35, wherein the threshold is a maximum acceptable value for the bit error rate.

37. A system for enabling communication between at least one end device and at least one application server in a short-range wireless networking environment, comprising:

at least one access point (AP), wherein each of the APs is adapted for communicating over at least one short-range wireless connection and at least one network connection;

at least one extension point (EP), wherein each of the EPs has a directional antenna and an omnidirectional antenna, each of the antennas adapted for short-range wireless connections;

means for establishing communication between at least one of the EPs and one of the APs, using one of the at least one short-range wireless connections of the AP and the directional antenna of the EP, and also with at least one selected one of the end devices, using the omnidirectional antenna of the EP; and means for transmitting traffic between a selected one of the application servers and the at least one selected one of the end devices, wherein the transmitted traffic flows between the selected application server and the AP using one of the at least one network connections of the AP, between the AP and a selected EP with which the AP is communicating and with which the at least one selected end device is also communicating, and between the selected EP and the at least one selected end device.

38. The system according to claim 37, wherein:

a short-range wireless link established connections using the omnidirectional antenna uses a protocol known as "Bluetooth".

39. The system according to claim 37, wherein the omnidirectional antenna of at least one of the EPs is used to communicate with another one of the EPs.

40. The system according to claim 37, wherein each EP comprises an antenna controller, an amplifier, a power supply, and a short-range communication function.

41. The system according to claim 40, wherein the short-range communication function is a Bluetooth module.

42. The system according to claim 37, further comprising means for providing a connection table which maintains a plurality of EP parameter blocks, each of the EP parameter blocks describing a route between one of the APs at a top level of a hierarchical connection structure and a selected one of the EPs, or a different one of the APs, which is communicably coupled to the AP at the top level.

43. The system according to claim 42, wherein the connection table is provided at a network control server.

44. The system according to claim 42, wherein the EP parameter blocks further describe earth or local coordinates of the selected EP or the different AP.

45. The system according to claim 37, wherein a position of the directional antenna is set to minimize a bit error rate of the wireless connection, and further comprising means for dynamically determining the position of the directional antenna, further comprising:

means for positioning the directional antenna of the at least one EP at a plurality of angles toward an omnidirectional antenna of the AP;

means for recording the bit error rate at each of the angles; and means for selecting that one of the angles which exhibits a minimal value of the bit error rate, while still maintaining the connection, to be the position of the directional antenna.

46. The system according to claim 45, wherein:

the plurality of angles are selected by first locating an initial position beyond which communication using the directional antenna is not possible; and a power of transmission of the directional antenna is set to a minimum value required to communicate on the wireless connection; and further comprising means for dynamically determining the power of transmission of the directional antenna, further comprising:

means for establishing a default value for the power of transmission;

means for recording a bit error rate at the default value;

means for successively reducing the power of transmission until the bit error rate crosses a threshold; and means for setting the power of transmission to be a value that results in the bit error rate staying below the threshold while still maintaining the connection.

47. An extension point (EP) device for enabling communication between at least one a plurality of end devices and at least one application server in a short-range wireless networking environment, comprising:

means for communicating, from the EP, with an access point (AP), wherein the AP is adapted for communicating over at least one short-range wireless connection and at least one network connection, wherein the means for communicating uses one of the at least one short-range wireless connections of the AP and a directional antenna of the EP;

means for communicating, from the EP, with at least one selected one of the end devices, using an omnidirectional antenna of the EP; and means for transmitting traffic between the application server and the at least one selected one of the end devices, wherein the transmitted traffic flows between the application server and the AP using one of the at least one network connections of the AP, between the AP and EP, and between the EP and the at least one selected end device.

48. The device according to claim 47, wherein:

a short-range wireless link established using the omnidirectional antenna uses a protocol known as "Bluetooth".

49. The device according to claim 48, wherein the omnidirectional antenna is used to communicate with another EP.

50. The device according to claim 47, wherein each EP comprises an antenna controller, an amplifier, a power supply, and a short-range communication function.

51. The device according to claim 50, wherein the short-range communication function is a Bluetooth module.

52. The device according to claim 47, wherein a position of the directional antenna is set to minimize a bit error rate of the wireless connection, and further comprising means for dynamically determining the position of the directional antenna, further comprising:

means for positioning the directional antenna at a plurality of angles toward an omnidirectional antenna of the AP;

means for recording the bit error rate at each of angles; and means for selecting that one of the angles which exhibits a minimal value of the bit error rate, while still maintaining the connection, to be the position of the directional antenna.

53. The device according to claim 52, wherein:

the plurality of angles are selected by first locating an initial position beyond which communication using the directional antenna is not possible; and a power of transmission of the directional antenna is set to a minimum value required to communicate on the wireless connection; and further comprising means for dynamically determining the power of transmission of the directional antenna, further comprising:

means for establishing a default value for the power of transmission;

means for recording a bit error rate at the default value;

means for successively reducing the power of transmission until the bit error rate crosses a threshold; and means for setting the power of transmission to be a value that results in the bit error rate staying below the threshold while still maintain the connection.

* * * * *

UNITED STATES PATENT AND TRADEMARK OFFICE
CERTIFICATE OF CORRECTION

PATENT NO. : 6,885,847 B1
DATED : April 26, 2005
INVENTOR(S) : Leon Lumelsky

It is certified that error appears in the above-identified patent and that said Letters Patent is hereby corrected as shown below:

Column 16,
Line 46, please delete "serves" and insert -- servers --.

Column 17,
Line 20, please delete "a".
Line 52, please insert -- a -- after the word "be".

Column 20,
Line 2, please delete "connections".

Column 21,
Line 9, please insert -- the -- after the words "AP and".

Column 22,
Line 1, please insert -- the -- after the word "of".

Signed and Sealed this

First Day of November, 2005

JON W. DUDAS
*Director of the United States Patent and Trademark Office*